Oct. 28, 1952     G. D. CLAPP     2,615,594
SILO UNLOADER

Filed Jan. 22, 1948     4 Sheets-Sheet 1

INVENTOR.
George D. Clapp,
BY
Cromwell, Greist & Warden

Oct. 28, 1952  G. D. CLAPP  2,615,594
SILO UNLOADER
Filed Jan. 22, 1948  4 Sheets-Sheet 2

INVENTOR.
George D. Clapp,
BY
Cromwell, Greist + Warden
ATTYS.

Oct. 28, 1952  G. D. CLAPP  2,615,594
SILO UNLOADER
Filed Jan. 22, 1948  4 Sheets-Sheet 3
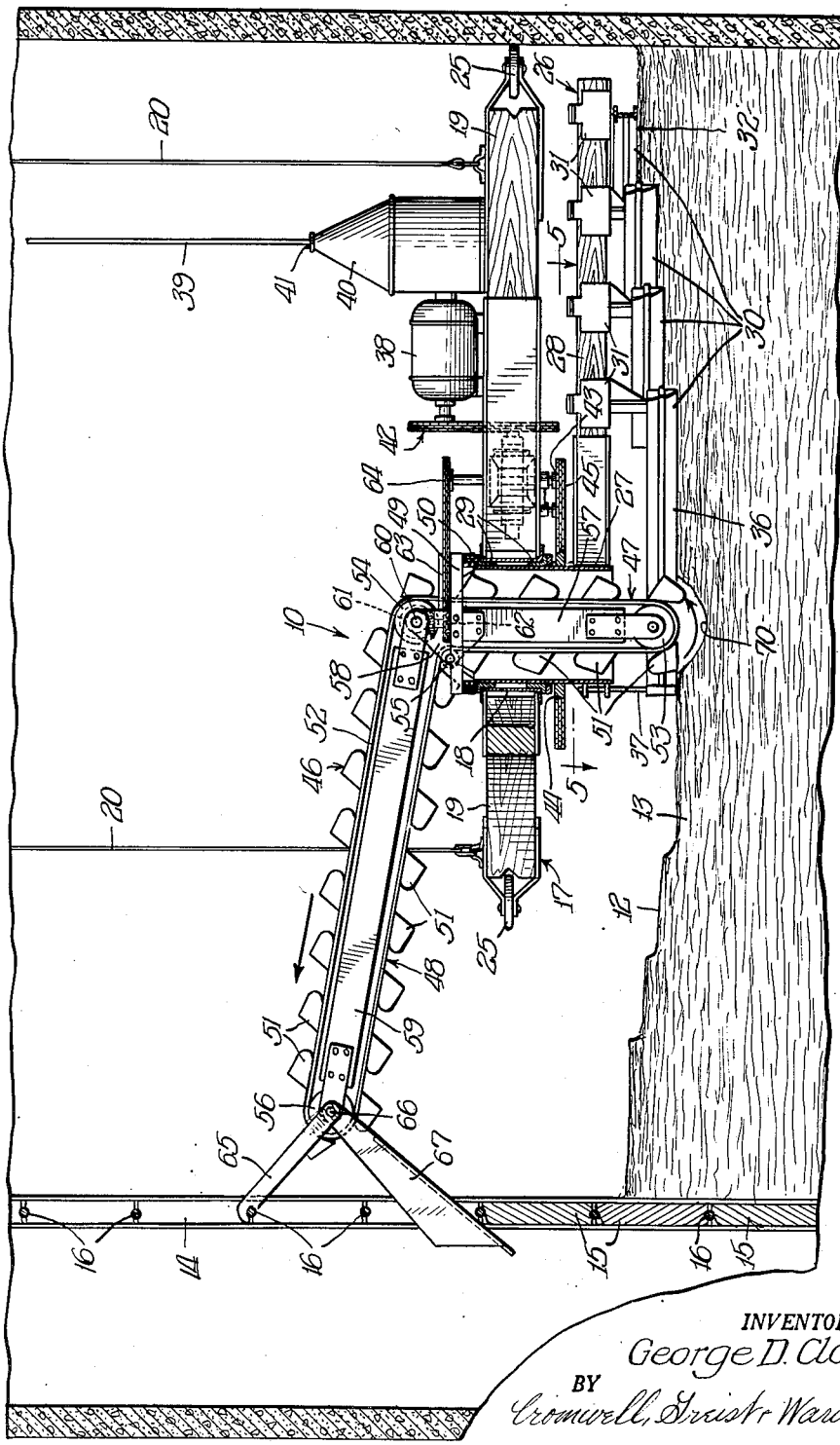
INVENTOR.
George D. Clapp,
BY
Cromwell, Greist + Warden
ATTYS.

Oct. 28, 1952 G. D. CLAPP 2,615,594
SILO UNLOADER
Filed Jan. 22, 1948 4 Sheets-Sheet 4
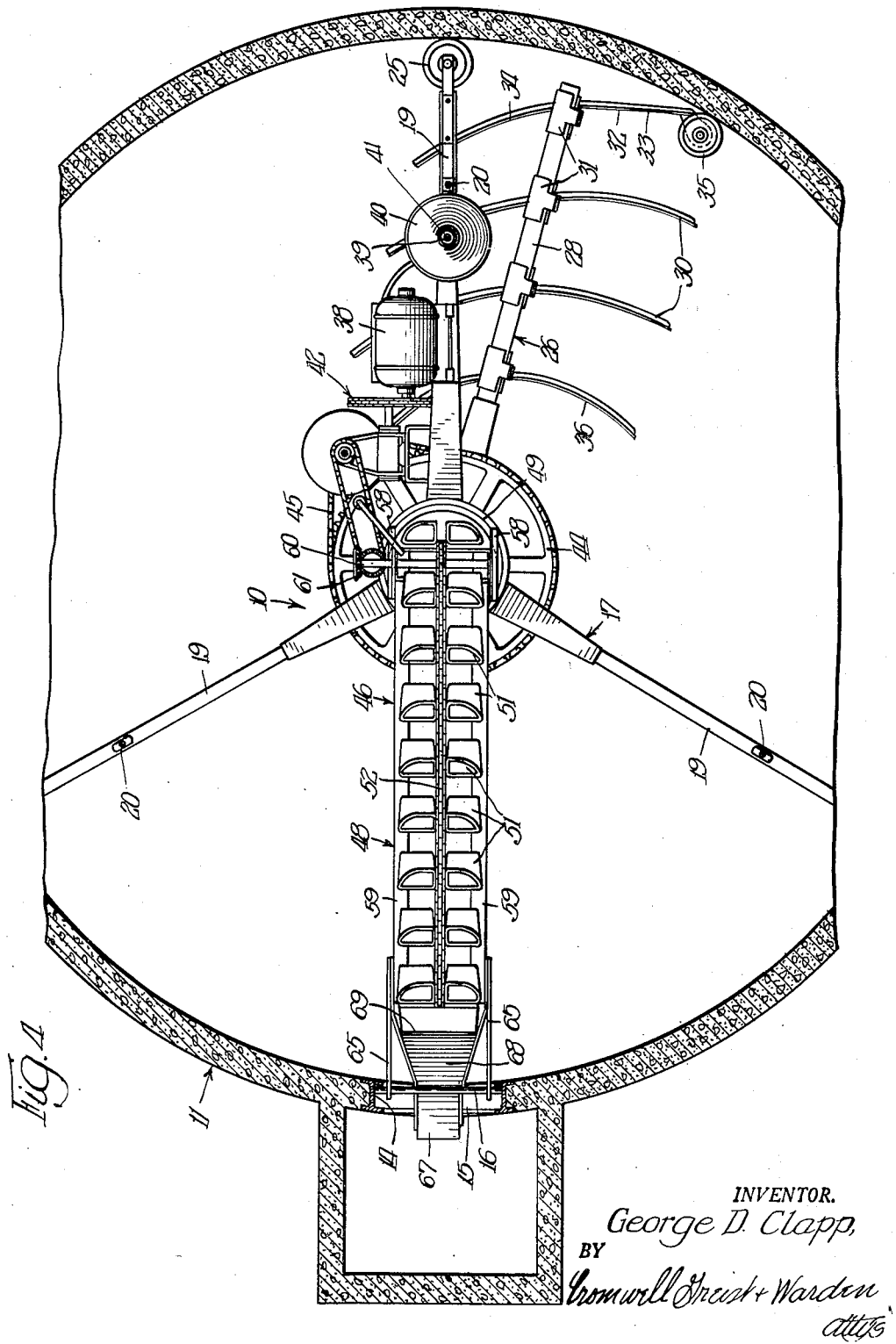
INVENTOR.
George D. Clapp,
BY
Cromwell Greist + Warden
attys Patented Oct. 28, 1952

2,615,594

UNITED STATES PATENT OFFICE 2,615,594

SILO UNLOADER

George D. Clapp, Oshkosh, Wis., assignor to Leach Company, Oshkosh, Wis., a corporation of Wisconsin Application January 22, 1948, Serial No. 3,740

3 Claims. (Cl. 222—80)

This invention is concerned with silo unloaders of the type in which the silage is cut loose from the upper surface of the silage in a silo by a slowly descending rotor, carried in toward the center, and picked up and discharged laterally through the usual chute opening in the side of the silo.

The principal object of the invention is to provide, in a silo of the type described, new and improved means for picking up the loosening silage and carrying it away.

Other more specific objects and advantages of the invention will be apparent to those skilled in the art upon a full understanding of the construction, arrangement and operation of the new silage handling means.

A preferred embodiment of the invention is presented herein for the purpose of exemplification but it will, of course, be appreciated that the invention is susceptible of incorporation in other structurally modified forms coming equally within the scope of the appended claims.

In the accompanying drawings:

Fig. 3 is a partially sectioned side view of the unloader;

Fig. 4 is a plan view of the unloader; and

Figure 1:
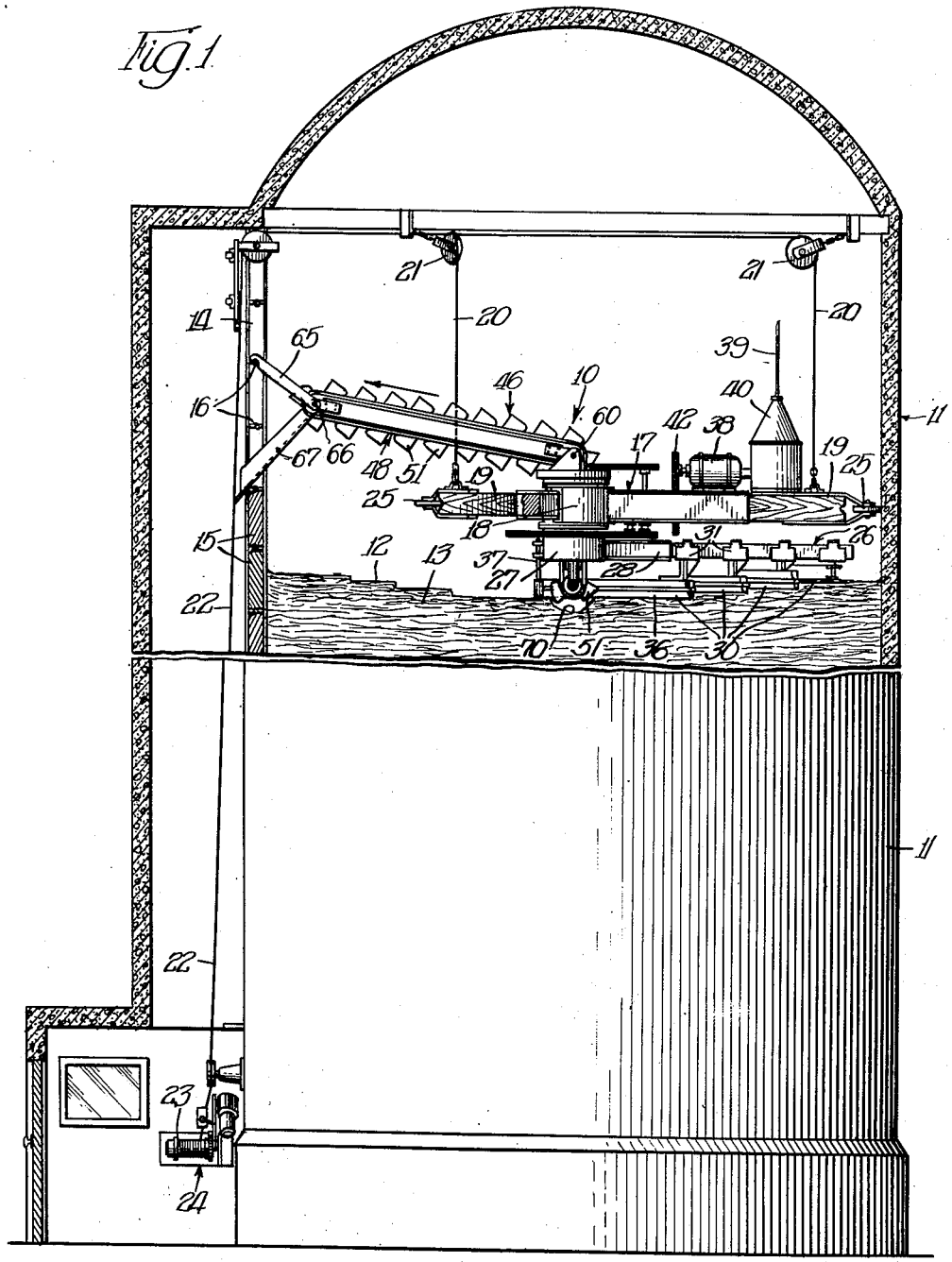
Fig. 1 is a partially sectioned side view of a silo equipped with an unloader constructed in accordance with the invention.

The unloader which constitutes the subject matter of the present invention is of the same general type as those disclosed in Leach, Manthie and Clapp application. Serial No. 614,564, now Patent No. 2,580,306, and Clapp application Serial No. 712,322, now Patent No. 2,595,333, differing primarily therefrom only in the way in which the loosening silage is picked up and discharged laterally, wherefore the disclosures in said applications are by reference included herein and only those features of the present unloader which are materially different in construction and operation will be described in detail.

The improved unloader, which is designated generally in the drawings by the numeral 10, is adapted to be installed in an ordinary silo 11, above the upper surface 12 of the more or less tightly compacted silage 13. In operation the unloader will cleanly cut and remove any desired quantity of silage in a uniform layer from the upper surface 12 of the same and will discharge it laterally through the usual opening 14 in the side of the silo. The opening 14 is closed off up to the level of the silage by serially removable panels 15 and is reinforced crosswise at vertically spaced intervals by rung-like bars 16.

The unloader includes a vertically movable, horizontally disposed frame 17 of generally spider-like form, which has a tubular hub 18 and three arms 19 which are rigidly connected with the hub and extend radially therefrom. The frame 17 is adapted to be supported centrally within the silo by three vertical suspension cables 20 which are connected with the arms 19 adjacent the outer ends of the latter. The cables 20 extend upwardly and laterally about pulleys 21 in the top of the silo and then downwardly on the outside of the silo, where they are preferably joined together to form a single cable 22. The cable 22 is connected near the ground level to the winding drum 23 of a pay-out mechanism 24, which mechanism may be the same as that disclosed in application Serial No. 614,564, now Patent No. 2,580,306. The frame 17 is maintained centered within the silo by anti-friction rollers 25 on the ends of the arms 19, which rollers engage with the inner wall of the silo and permit limited rotary movement of the frame.

The silage is cut from the surface of the silage and brought in toward the center of the frame 17 by means of a rotor 26. The rotor 26, which is connected to the frame 17 in a position directly beneath the latter, includes a vertically disposed tube 27 and a radially extending arm 28. The tube 27 is telescopically positioned within the hub 18 of the frame 17 and is rotatably mounted therein on upper and lower bearings 29. The arm 28 is rigidly secured at its inner end to the lower end of the tube 27 and is provided on its underside with a plurality of curved angularly disposed cutting blades 30.

Figure 2:
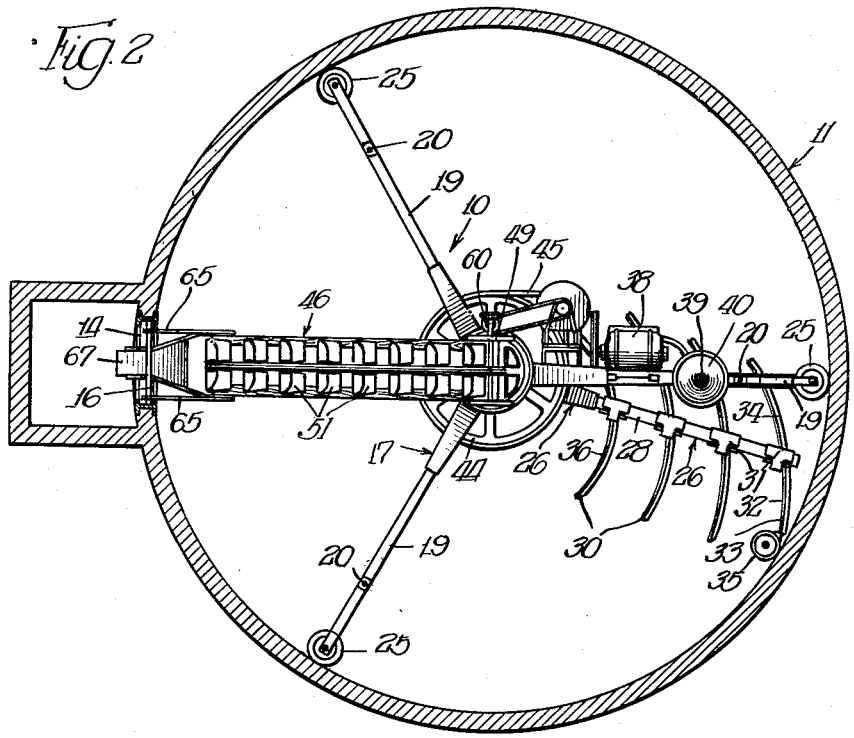
Fig. 2 is a horizontal section through the upper portion of the silo, taken immediately above the unloader.
Figure 5:
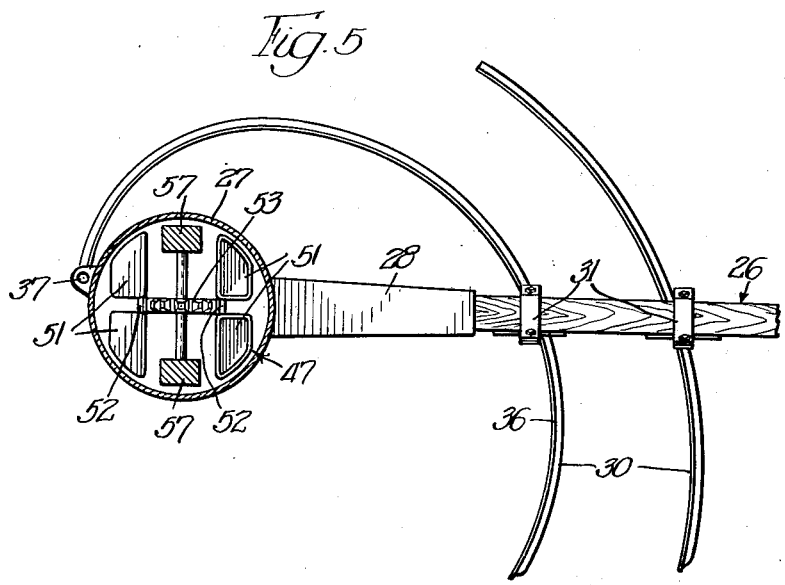
Fig. 5 is a horizontal section through the unloader, taken on approximately the line 5—5 of Fig. 3.

The blades 30, which serve to both cut the silage and bring it in toward the center of the frame 17, are rigidly secured at intervals to the arm 28 by brackets 31, with the cutting circle of each blade overlapping that of the next outwardly disposed blade, as shown in Fig. 2, and with the lower edge of each blade preferably set at a lower level than that of the next outwardly disposed blade, to obtain a circularly terraced cut, as shown in Fig. 3. The lower cutting edges of the blades 30 may be either straight or serrated, as desired.

The outermost blade 32 is preferably provided with an outwardly spring-pressed front section 33 which is pivotally connected at its rear end to the front end of the fixed rear section 34. The front end of the front section 33 is provided with an anti-friction roller 35 which engages with the inner wall of the silo to deflect the front section inwardly to a certain extent, whereby to maintain it in close but uniformly spaced relation to the wall.

The innermost blade 36 is preferably of generally semi-circular or parabolic form and spans the area directly beneath the lower end of the tube 27 of the rotor, being connected at its inner end to a rod 37 which extends downwardly from the tube 27 at the far side of the arm 28. This shaping and arrangement of the innermost blade 36 causes all of the loosened silage to be brought into a position directly beneath the lower open end of the tube 27.

The rotor 26 is caused to revolve at a slow rate of speed—preferably in the neighborhood of about three revolutions per minute—by an electric motor 38, which motor is mounted on one of the centering arms 19 of the frame 17. The electric cord 39 for the motor is coiled within a container 40 which is positioned alongside the motor. The cord 39 extends first upwardly to the top of the silo and then downwardly outside the same. As the unloader gradually descends in the silo the cord 39 will play itself out through a small opening 41 which is located in the top of the container.

The rotor 26 is driven from the motor 38 by a suitable power transmitting connection 42, which connection includes a small sprocket 43 which is journalled on the same arm of the frame 17 as the motor, a large sprocket 44 which is fixedly secured to the outside of the tube 27 of the rotor in concentric relation thereto, and a chain 45 which is trained about both sprockets.

The means for handling the loosened silage—which is the feature of the unloader with which the present invention is primarily concerned—comprises an endless bucket-type conveyor 46 of unique construction, arrangement and operation. The conveyor 46 is of generally inverted L-shaped form and is characterized by two articulated sections, one a lower vertically extending section 47 and the other an upper laterally extending section 48.

The conveyor 46 is supported from the upper end of the tube 27 of the rotor 26 by means of a turret ring 49, which ring is rotatably mounted on the tube on an interposed bearing 50. The vertically extending section 47 of the conveyor is for the most part housed within the tube 27, while the laterally extending section 48 of the conveyor is positioned above and to one side of the upper end of the tube, projecting laterally at a variable upward inclination toward the opening 14 in the side wall of the silo, all as shown in Fig. 3.

The conveyor 46 is characterized by a large number of small forwardly opening scoop-shaped buckets 51, which buckets are divided along the center line of the conveyor and are connected along such line to an endless chain 52. The chain 52 is trained about a bottom sprocket 53 at the lower end of the vertically extending section 47 of the conveyor; is trained about two closely spaced intermediate sprockets 54 and 55 at the upper end of the vertically extending section 47; and is also trained about another sprocket 56 at the outer end of the laterally extending section 48. The bottom sprocket 53 is disposed a substantial distance below the lower open end of the tube 27 of the rotor and is mounted for rotation between the lower ends of a pair of spaced vertically extending truss members 57, which truss members are rigidly connected adjacent their upper ends to a pair of side brackets 58 carried by the ring 49. The intermediate sprockets 54 and 55 are mounted for rotation between the side brackets 58. The sprocket 56 at the outer end of the laterally extending section 48 of the conveyor is mounted for rotation between the outer ends of another pair of truss members 59. The inner ends of the truss members 59 are pivotally connected to the side brackets 58 on the axis 60 of the sprocket 54, whereby to allow the outer end of the laterally extending section 48 of the conveyor to swing in a vertical plane about the axis 60 during descent of the unloader. The sprocket 54 drives the chain 52, while the end sprockets 53 and 56 and the other intermediate sprocket 55 are idlers, with the sprocket 55 placed to form the reentrant angle in the chain.

The chain 52 of the conveyor is driven in the direction of the arrow in Fig. 3 by the motor 38 through the sprocket 54. The sprocket 54 is rotated by bevel gearing 61 from a sprocket 62 which is connected by a chain 63 with a sprocket 64, which latter sprocket forms a part of the previously mentioned power transmitting connection 42.

The outer end of the laterally extending section 48 of the conveyor 46 is supported from one of the rungs 16 in a position adjacent the opening 14 in the side wall of the silo by a pair of hooks 65, which hooks extend downwardly and inwardly at an inclination from the rung and are pivotally connected to the outer end of the conveyor at the axis 66 of the end sprocket 56. A discharge trough 67 of generally U-shaped cross section is similarly pivoted to the outer end of the conveyor in a position beneath the hooks 65, the trough 67 extending downwardly and outwardly at an inclination with its lower end resting on one of the rungs 16. At the upper end of the trough 67 the bottom 68 of the same is cut away down to the point 69 in order to permit the buckets 51 after discharging the silage into the trough from above the same to clear the bottom 68 in fully inverting at the commencement of their return trip.

The lower end of the vertically extending section 47 of the conveyor 46 is preferably so located as to cause the lowermost buckets 51 to cut out a shallow center recess 70 in the surface of the silage, below the level of the surface cut by the innermost blade 36 on the rotor 26. The silage cut by the innermost blade 36, together with all of the silage gathered by that blade from the other outlying blades, will be deposited by the innermost blade in or above the recess 70, thus insuring at the end of the operation that the last remnants of the loosened silage will be picked up and carried away by the buckets 51. Complete removal of the loosened silage is of importance in preventing the spoilage which otherwise frequently occurs in silage when it is permitted to stand in a loose condition for any length of time.

While the operation of the unloader will be understood from the foregoing description it may be summarized as follows:

When the unloader is to be operated to discharge down to the ground level any desired quantity of silage the pay-out mechanism 24 is set to permit the unloader to descend the required number of inches and the motor 38 is started, whereupon the rotor 26 will commence to revolve and the conveyor 46 will commence to travel. Upon each revolution of the rotor 26 the blades 30 will cut thin layers of silage from the upper surface 12 of the compacted silage and will move the loosened silage inwardly, each blade depositing its cut silage in the path of the next inwardly disposed blade on the annular terrace cut by that blade. At the same time the lowermost buckets 51 of the conveyor will cut into the conforming recess 70 and will remove from the recess all of the silage brought in by the blades, which silage is swept into the area of the recess 70 by the innermost blade 36. During rotation of the rotor 26 the frame 17 will turn backwardly in a horizontal plane through a small angle, the amount of turning of the frame varying with the resistance encountered by the blades 30 in cutting. The conveyor 46, however, will remain in the same position relative to the silo, the swivel mounting of the conveyor provided for by the turret ring 49 permitting the frame 17 to adjust itself in this manner. After the desired depth of silage has been cut further downward movement of the frame 17 will be halted, automatically or otherwise, by the pay-out mechanism 24. The rotor 26 and conveyor 46 are then permitted to continue in operation for several minutes, whereby to enable all of the loosened silage to be swept into the center depression 70 and carried away, leaving the upper surface 12 of the silage substantially free from loose silage. After several cuttings have been effected and the frame 17 substantially lowered in the silo as a result thereof, the hooks 65 and discharge trough 67 can be temporarily disconnected and lowered to a new position wherein the laterally extending section 48 of the conveyor is more nearly horizontal again.

I claim:

1. In a silo unloader for installation in a silo above the surface of the silage, a vertically movable frame which is adapted to be centered in the silo, a radially disposed rotor arm which is rotatably connected at its inner end to the frame at the center of the latter, means on the arm for cutting the silage loose from the upper surface of the silage and moving the loosened silage in toward the center of the frame upon rotation of the arm, a single endless bucket type conveyor for picking up the loose silage and discharging it laterally from the silo, said conveyor being of inverted generally L-shaped form and being characterized by two articulated sections, one of which extends downwardly to a point beneath the frame through an opening in the center of the latter, and the other of which is pivotally supported at its inner end from the upper end of the first section and extends laterally from above the frame, means for rotating the rotor arm and driving the conveyor, and means for gradually lowering the frame in the silo during the cutting operation.

2. In a silo unloader for installation in a silo above the surface of the silage, a vertically movable frame which is adapted to be centered in the silo, a radially disposed rotor arm which is rotatably connected at its inner end to the frame at the center of the latter, means on the arm for cutting the silage loose from the upper surface of the silage and moving the loosened silage in toward the center of the frame upon rotation of the arm, a single endless bucket type conveyor for picking up the loose silage and discharging it laterally from the silo, said conveyor being of inverted generally L-shaped form and being characterized by two articulated sections, one of which extends downwardly to a point beneath the frame through an opening in the center of the latter, and the other of which is pivotally supported at its inner end from the upper end of the first section and extends laterally from above the frame, means for rotating the rotor arm and driving the conveyor, and means for gradually lowering the frame in the silo during the cutting operation, the free end of the laterally extending section of the conveyor being vertically adjustable relative to its other end and being adapted for connection with a support at one side of the silo.

3. In a silo unloader for installation in a silo above the surface of the silage, a vertically movable frame which is adapted to be centered in the silo, a radially disposed rotor arm which is rotatably connected at its inner end to the frame at the center of the latter, means on the arm for cutting the silage loose from the upper surface of the silage and moving the loosened silage in toward the center of the frame upon rotation of the arm, a single endless bucket type conveyor for picking up the loose silage and discharging it laterally from the silo, said conveyor being of inverted generally L-shaped form and being characterized by two articulated sections, one of which extends downwardly to a point beneath the frame through an opening in the center of the latter, and the other of which is pivotally supported at its inner end from the upper end of the first section and extends laterally from above the frame, means for rotating the rotor arm and driving the conveyor, and means for gradually lowering the frame in the silo during the cutting operation, the free end of the laterally extending section of the conveyor being vertically adjustable relative to its other end and being provided with suspension hooks above its free end and a discharge chute beneath its free end.

GEORGE D. CLAPP.

REFERENCES CITED

The following references are of record in the file of this patent:

UNITED STATES PATENTS

| Number | Name | Date |
|---|---|---|
| 1,222,286 | Hamilton | Apr. 10, 1917 |
| 1,233,308 | Burgess | July 17, 1917 |
| 1,740,250 | Kutz et al. | Dec. 17, 1929 |
| 2,057,403 | Vali et al. | Oct. 13, 1936 |
| 2,518,601 | Cordis | Aug. 15, 1950 |

FOREIGN PATENTS

| Number | Country | Date |
|---|---|---|
| 547,957 | Great Britain | Sept. 21, 1942 |
| 110,384 | Germany | May 10, 1900 |